United States Patent
Bhansali et al.

(10) Patent No.: US 8,541,910 B1
(45) Date of Patent: Sep. 24, 2013

(54) MEMS MICROGENERATOR CELL AND MICROGENERATOR CELL ARRAY

(75) Inventors: Shekhar Bhansali, Tampa, FL (US); Rajsekhar Popuri, Tampa, FL (US)

(73) Assignee: University of South Florida, Tampa, FL (US)

( * ) Notice: Subject to any disclaimer, the term of this patent is extended or adjusted under 35 U.S.C. 154(b) by 2054 days.

(21) Appl. No.: 11/162,697

(22) Filed: Sep. 20, 2005

Related U.S. Application Data

(63) Continuation of application No. PCT/US2004/008625, filed on Mar. 22, 2004.

(60) Provisional application No. 60/320,026, filed on Mar. 20, 2003.

(51) Int. Cl.
*H02K 44/00* (2006.01)

(52) U.S. Cl.
USPC ............ 310/11; 136/243; 417/50; 102/202.5; 102/202.7; 102/202.9

(58) Field of Classification Search
USPC ............. 136/243; 310/11, 208, 339; 417/50; 102/202.5, 202.7, 202.9
See application file for complete search history.

(56) References Cited

U.S. PATENT DOCUMENTS

| | | | | |
|---|---|---|---|---|
| 3,201,635 A | * | 8/1965 | Carter | 313/156 |
| 5,582,119 A | * | 12/1996 | Barkdoll | 110/346 |
| 5,932,940 A | * | 8/1999 | Epstein et al. | 310/40 MM |
| 5,943,076 A | * | 8/1999 | Burke et al. | 347/64 |
| 6,146,103 A | * | 11/2000 | Lee et al. | 417/50 |
| 6,378,292 B1 | * | 4/2002 | Youngner | 60/224 |
| 2004/0079301 A1 | | 4/2004 | Perlo et al. | |

OTHER PUBLICATIONS

F.J. Agee et al., Experimental Studies of Explosively-Driven Magnetohydrodynamic Generators, Air Force Research Laboratory, Kirtland Air Force Base, Oct. 1997, p. 1-34.
Shekhar Bhansali et al., Prototype Feedback-Controlled Bidirectional Actuation System for MEMS Applications, Jounal of Microelectromechanical Systems, 9(2), Jun. 2000, 245-251.
Cardenas-Valencia et al., A Micro-Fluidic Galvanic Cell as an On-Chip Power Source, Sensors and Actuators B; Chemical vol. 95 No. 1-3, Oct. 2003, p. 406-413.
Kaili Zhang et al., MEMS-Based Solid Propellant Microthruster Design, Simulation, Fabrication and Testing, J. of Microelectromechanical Systems, V.13 N.2 Apr. 2004, 165-175.

* cited by examiner

*Primary Examiner* — Jonathan Johnson
*Assistant Examiner* — Thanh-Truc Trinh
(74) *Attorney, Agent, or Firm* — Michael M. McGaw; Anton J. Hopen; Smith & Hopen, P.A.

(57) ABSTRACT

A microelectrical mechanical system (MEMS) microgenerator cell and array is disclosed. The MEMS microgenerator cell of the present invention is effective in the conversion of thermal energy to electrical energy. In accordance with the present invention, an explosive material is loaded into a chamber. A diaphragm seals the chamber, containing a plasma material. The explosive material is subsequently heated to its ignition temperature thereby raising the pressure in the chamber until the diaphragm ruptures. The rupture of the diaphragm results in the flow of plasma out of the chamber. Upon exiting the chamber, the plasma is forced to flow between two parallel rectangular electrodes. A magnetic field is applied in a direction orthogonal to both the plasma flow and the electrodes, thereby generating an electromagnetic field sufficient to a power source for MEMS devices.

20 Claims, 1 Drawing Sheet

MEMS MICROGENERATOR CELL AND MICROGENERATOR CELL ARRAY

CROSS-REFERENCE TO RELATED APPLICATIONS

This application is a continuation of International Patent Application No. PCT/US2004/008625, filed on Mar. 22, 2004, which claims the benefit of U.S. Provisional Patent Application Ser. No. 60/320,026 filed Mar. 20, 2003.

BACKGROUND OF INVENTION

MEMS devices are based on using microelectronic wafer fabrication techniques to produce complex shapes in the µm to mm size range with embedded sensors, actuators and circuitry. Microelectromechanical systems (MEMS) have been developed as alternatives to conventional electromechanical devices. MEMS devices are potentially low-cost devices, due to the use of microelectronic fabrication techniques. New functionality also may be provided, because MEMS devices can be much smaller than conventional electromechanical devices.

Micro power generation techniques known in the art include thermo-electric converters, micro combustion engines, micro fuel cells, and micro fuel reformers. Hydrocarbon fuels offer attractive alternatives as power sources due to their superior energy densities. For example, the energy densities of propane, methane, gasoline, and diesel are at least 50 to 100 times higher than the best lithium-ion batteries. Typical solid propellant has an energy density of around 5 $J/mm^3$. Commercial Zinc-air batteries have an energy density of just 3 $J/mm^3$. Commercial lithium batteries have an energy density of only 0.3 $J/mm^3$, and gold capacitor has an energy density of 9 $J/mm^3$. Accordingly, the conversion of the chemical energy contained in the solid propellant to useful energy would provide a micro scale combustion device that would be competitive with commercial batteries.

Microthrusters are also known in the art, primarily for the use with propulsion of micro satellites. These systems deliver great force and are too heavy for micro satellites. Also the configuration is relatively complicated and expensive to make. The main applications for the micro thrusters are high accuracy station keeping and attitude control of micro-spacecraft.

It is known in the art that magnetohydrodynamic (MHD) technology has the potential to obtain the lowest cost of electricity with the highest efficiency. The MHD principle is widely used for pumping of liquid and in the metallurgical industry. The idea is now also seriously considered for ship propulsion using the saline seawater as the conducting medium to drive ships. This is a particular interest for submarine propulsion because of the potentially noiseless operation of such an MHD drive using a liquid medium. The rapidly increasing demand for energy throughout the world cannot be sustained without a substantial reduction in the environment and thermal pollution that would be associated with such demand. MHD conversion technology offers a remedial solution. MHD generators are extremely efficient and provide a direct and clean conversion of heat energy to electricity. Magnetohydrodynamic technology will play a critical role in the future fight to bring under control the negative environmental impact of expanding power demands.

The field of MEMS grew out of the integrated circuit industry. Initially, layered silicon microstructures were fabricated. These structures evolved into single function sensors and actuators that were then combined into systems with integrated circuit controllers. Currently, macroscopic power supplies are being used to power these microscopic systems. What is needed in the art is the integration of the micro sensor and actuator systems currently known in the art with an effective micro power supply.

To date, the primary focus of MEMS has been on sensors, actuators and specific applications of the technology. One area that has been largely neglected is how to provide power for microscopic sensors and actuators. The development of a power supply that is equal in scale to the sensors and actuators currently known in the art will permit local control of each component through an independent power supply, thus reducing the overall complexity of the control system. Advantages in terms of efficiency and speed of operation will also be realized.

Therefore, there exists a need in the art for a micro power generation devices for use in microelectromechanical systems.

SUMMARY OF INVENTION

In accordance with the present invention, a power supply at the same scale as the sensors, actuators and electronics employed in a microelectromechanical system is provided. The present invention provides a micro magnetohydrodynamic (MHD) generator effective in the conversion of thermal energy to electrical energy. In accordance with one embodiment of the present invention, an explosive material is loaded into a chamber. The chamber contains a plasma material and is sealed by a diaphragm. The explosive material is subsequently heated to its ignition temperature thereby raising the pressure in the chamber until the diaphragm ruptures. The rupture of the diaphragm results in the flow of plasma out of the chamber. Upon exiting the chamber, the plasma is forced to flow between two parallel rectangular electrodes. A magnetic field is applied in a direction orthogonal to both the plasma flow and the electrodes, thereby generating an electromagnetic field by means of the Faraday Effect.

In an embodiment in accordance with the present invention, a microgenerator cell is provided including a chamber with a first cavity and a second cavity, an explosive igniter at least partially suspended within the first cavity, a diaphragm is positioned between the first cavity and the second cavity. The diaphragm is cooperatively dimensioned with the igniter to rupture upon the explosion of the explosive igniter. A propellant is disposed in the second cavity. The propellant is selected to expand rapidly in response to the igniter exploding through the broken diaphragm. Two electrodes are positioned at the distal end of the second cavity. The electrodes are cooperatively dimensioned with the second cavity such that the propellant flows between the two electrodes upon expansion. Two magnets of opposite polarity are cooperatively dimensioned and positioned to establish a magnetic field orthogonal to the direction of propellant flow through the electrodes and orthogonal to the electrodes. The flow of the propellant in combination with the magnetic field establishes an electrical potential between the electrodes, thereby supplying a power source for the MEMS devices.

The chamber of the microgenerator cell is disposed on a substantially planar silicon substrate using deep reactive ion etching. Common techniques known in the art for microelectronic wafer fabrication may be utilized in the construction of the microgenerator cell.

The explosive igniter of the microgenerator cell includes an explosive material positioned within the first cavity and a resistive heater positioned adjacent the explosive material. The resistor is separated from the explosive material by an insulating layer. The explosive material may be lead styphnate. In one embodiment of the invention, the resistive heater is a poly-silicon micro-resistor. The micro-resistors preferably fabricated on a silicon substrate and subsequently adhered to the chamber layer of the microgenerator cell.

The propellant for use in the microgenerator cell is preferably a gas having high electrical conductivity. The propellant may be a plasma and the plasma may be seeded with an alkali metal.

In accordance with the present invention, a plurality of microgenerator cells are fabricated in an array. The array of cells provides a substantial power source. Additionally, the design of the array provides for the explosive igniters to be individually selectable and ignitable. As such, each microgenerator cell can be commanded to fire individual chambers, several at once or in a controlled sequence.

Many advantages are realized with the microgenerator cell and array in accordance with the present invention. The design of the microgenerator cell eliminates the need for moving parts, valves or external tanks. The microgenerator is equal in scale to the MEMS sensors and actuators requiring power. And, the microgenerator cell in accordance with the present invention is environmentally friendly and efficient.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

MEMS structures known in the art today are designed to use macroscopic power supplies, thereby placing limits on the functionality of MEMS structures in many applications. A significant consideration for micro power generators is that the system exhibits high power density, compactness, and superior conversion efficiencies. A system meeting these objectives is of ultimate importance in power application for MEMS systems.

When a conducting fluid is under the influence of an electromagnetic field, the flow pattern is altered. The magnetic field and the motion of conducting fluid particles generate an electric current. This current and magnetic field interact with each other, and change the flow of motion. The interaction is referred to as magneto hydrodynamics, MHD. One of the most popular applications of MHD is an electric generator. Since there is not mechanical friction in such a system, the generator is very efficient. The continuous electrode Faraday generator provides the simplest demonstration of MHD. A pair of electrodes passes current across a channel that carries a fast flowing ionized gas normal to the magnetic field and enables power to be fed to a single load. In an MHD generator electron energy is derived mainly from the enthalpy of the flow and enables power to be fed to a single load. The continuous electrodes allow a longitudinal Hall current to arise. The resultant deviation of the net current from the normal to the flow is the Hall angle, which reduces the output of the generator. The segmented faraday generator overcomes this, by loading several pairs of electrodes down the channel with separate resistances.

The MHD microgenerator of the present invention meets the desired objectives for providing a MEMS power supply. In one embodiment of the present invention, a four-layered integrated circuit structure is fabricated containing micro resistors, an array of micro thrusters and permanent magnets. Additionally, the system of the present invention has no moving parts, valves, lines or external tanks. The array of microthrusters can be commanded to fire individual thrusters, several thrusters at once, or in a controlled sequence to obtain the required power. The system is compact with reasonably high power density and conversion efficiency. Thereby providing a novel approach to power generation applicable to MEMS systems.

Figure 1:
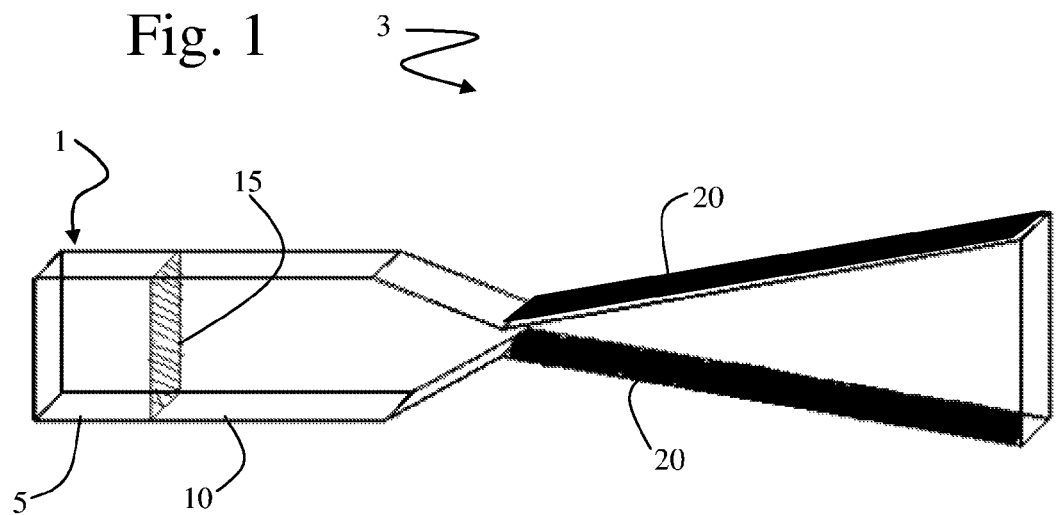
FIG. 1 is a diagrammatic view of the microgenerator cell in accordance with the present invention.

FIG. 1 is a partial illustration of the MEMS microgenerator cell 3 in accordance with the present invention. As shown in the view, the microgenerator cell includes a chamber 1, a first cavity 5 and a second cavity 10 separated by a diaphragm 15, and two electrodes 20. The cell also includes two magnetic elements placed orthogonal to the electrodes, now shown in this view. The first cavity is at least partially filled with an explosive igniter. In a preferred embodiment, the combination of an explosive material loaded into the first cavity and a microresistor positioned to provide sufficient heat to the explosive material to initiate an explosive reaction defines the explosive igniter.

Figure 2:
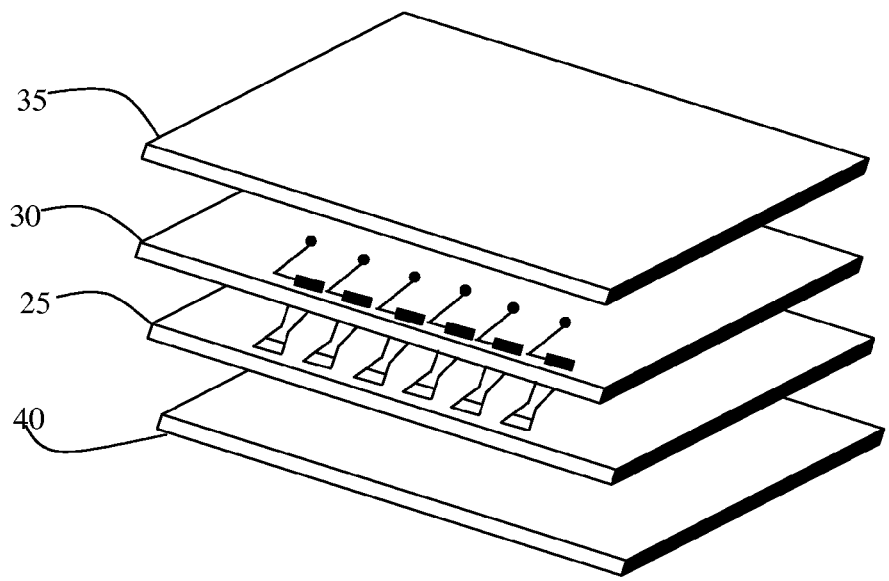
FIG. 2 is a diagrammatic cross sectional view of the microgenerator cell in accordance with the present invention.

As shown with reference to FIG. 2, in an exemplary embodiment, the micro MHD power source is comprised of a four-layered structure with an array of chambers as previously described with reference to FIG. 1 25, an array of micro resistors 30 and an upper 35 and lower 40 permanent magnet layer. As shown in FIG. 2, an array of microgenerator cells are provided. In operation, the micro resistors can be addressed individually with sufficient voltage applied to heat the explosive igniter. The explosive igniter preferably heats to a temperature sufficient to ignite, rupture the diaphragm, and explode the adjacent propellant.

Conventional semiconductor manufacturing techniques may be used to make the microgenerator according to the present invention in general, and microgenerator cell in particular. In an exemplary embodiment, the array of chambers is realized by deep reactive ion etching (DRIE) on Shott glass of 500 μm thick, using a thick photoresist to mask. The array of chambers shown in the FIG. 2 has a volume of 4 mm×2 mm×300 μm. An explosive, such as lead styphnate, is loaded into the chambers, and sealed with a dielectric diaphragm. The volume of the explosive pit in the chambers is 1.5 mm×2 mm×300 μm. The amount of lead styphnate in the explosive pit comes is approximately 0.9 mg. In order to realize a high-energy efficiency required for the generator, high electron conductivity, rapid acceleration of the conducting medium and a strong magnetic field are essential. The high electron conductivity is achieved by seeding the explosive with 1% wt of potassium. Fortunately the gas does not need to be very highly conductive for the MHD generator to work. A minimum conductivity would be on the order 10 mho/m. However, 10 mho/m is still a very high conductivity for a gas and in practice, materials that can be easily ionized must be added so that a reasonable conductivity may be obtained at a temperature in the 2000 k range. Such a condition means that elements with low ionization potentials, like alkali metals, are ideal candidates for seeding. Although the gas is sometimes referred to as plasma, only about 1% of the gas is seed vapor and only about 1% of this ionized. Consequently the possibility of the power generation lies with only a small fraction of the volume of working gas. Although ionized, the working gas is still composed mainly of neutral atoms, which carry nearly all of the kinetic energy of the stream. These neutral atoms are unaffected directly by the electromagnetic field. The applied magnetic field exerts a force on these electrons so that they move in tight circles, which in turn act upon the positive ions due to the coulomb electrostatic attractive forces. Ion-neutral collisions then provide the last link in the chain, which provides an effective coupling between the magnetic field and the neutrals of the gas. The magnetic of the braking force is thus a complex function of this braking force that slows down the gas, thus converting the kinetic energy directly to electron energy. The resistive layer contains a matching of poly-silicon micro-resistors. These resistors are fabricated on top of a 3 µm $SiO_2$ insulating layer. The layer of chambers are filled with lead styphnate in the explosive pit and bonded with the layer containing the micro-resistors using cyanoacrylate. An upper magnet and a lower magnet are bonded to the other layers with cyanocrylate as shown in FIG. 2, thereby providing a microgenerator cell in accordance with the present invention.

The theoretical flow gas equations governing the operation of the microgenerator include characteristic values for gas density, gas temperature and gas velocity which are only depend on time and position. The equations governing the gas flow are as follows:

The conservation of mass:

$$\frac{\partial(\rho S)}{\partial t} + \frac{\partial(\rho u S)}{\partial x} = 0$$

The conservation of momentum:

$$\frac{\partial(\rho u S)}{\partial t} + \frac{\partial(\rho u S)}{\partial x} + S\frac{\partial P}{\partial x} = 0$$

The conservation of energy:

$$\frac{\partial(\rho u S)}{\partial t} + \frac{\partial(\rho u e S)}{\partial x} = 0$$

The mass action law or Saha equation for thermal ionization is given by:

$$\frac{n_e n_i}{n_s} = \frac{(2\pi m_e kT)^{\frac{3}{2}}}{h^3}\frac{2g_i}{g_o}\exp\left(-\frac{e\varepsilon_i}{kT}\right)$$

The electron density $n_e$ calculated from the above equation is $10^{19}/m^3$ (assumed value). The open circuit voltage developed at the electrodes in the MHD channel is given by: $V_{oc}=UBD$ Where, U=flow speed in m/s, B=magnetic field strength in Tesla, and d=distance between the pickup electrodes in meters. The power delivered to the load for the MHD generators for the low magnetic Reynolds number case can be estimated for a rectangular channel.

$$P = \frac{-\sigma U^2 B^2}{4} \times lbd$$

Where, σ=electrical conductivity in Siemens/m, lbd are the length, depth, and width of the channel in meters. The generator load parameter is defined as the ratio of the generator output voltage under load to open circuit generator voltage. Maximum power output is delivered to the load when K=0.5. The magnetic Reynolds number, $R=\mu_0\sigma Ud$, is a measure of the magnetic field trapped in the flow of the plasma. When $R_m<1$, one can assume no magnetic field is trapped near the boundaries of the channel. Note that for the very high magnetic Reynolds number case, the power delivered by the generator is independent of the conductivity of the plasma and the length of the plasma slug. Also, the power only depends linearly on the flow velocity.

In order to estimate power, the electrical conductivity must be determined. For the case of a singly ionized gas, the Spitzer conductivity can be approximated by:

$$\sigma = \frac{0.943\sqrt{\frac{\pi}{8m_e}}}{e^2\ln\left[\frac{3(kT)^{\frac{3}{2}}}{e^3\sqrt{8\pi n_e}}\right]}(kT)^{\frac{3}{2}} \text{ Siemens/m}$$

In this expression, k=Boltzmann Constant=$1.38\times10^{-23}$ J/K, T=electron temperature in Kelvin, $m_e$=mass of electron=$9.11\times10^{-31}$ kg, and e=$1.6\times10^{-19}$C. With the gas speed estimated at 4200 m/s, a reasonable valve for electron temperature is 1800K if a two percent degree of ionization is assumed. Under the above conditions, the electron density, $n_e$, is $10^{19}$ $m^{-3}$. Thus, the electrical conductivity is inversely proportional to an appropriately averaged electron-heavy particle collision cross section.

From the relations stated above, the peak power delivered is 231 mW. Voltage across the load and the maximum load current are 3.024 v and 0.204 A respectively. The microresistor used to ignite the explosive can be driven to 530K with about 5 mW applied power. The efficiency of the generator will be approximately 46%.

According, a microgenerator cell and microgenerator cell array is provided containing microresistors, an array of microthrusters and permanent magnets. The array of microthrusters can be commanded to fire individual thrusters, several thrusters at once, or in controlled sequence to obtain the required power. The system is compact with reasonably high power density and conversion efficiency and as such, provides a novel approach to micro power generation.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A microgenerator cell comprising:
   a microchamber having a first cavity and a second cavity;
   an explosive igniter at least partially suspended within the first cavity;
   a diaphragm positioned between the first cavity and the second cavity, the diaphragm cooperatively dimensioned with the igniter to rupture upon the explosion of the explosive igniter;
   a propellant disposed in the second cavity, the propellant selected to expand rapidly in response to the igniter exploding through the ruptured diaphragm;
   two electrodes positioned at a distal end of the second cavity, the electrodes cooperatively dimensioned with the second cavity such that the propellant flows between the two electrodes upon expansion; and
   two magnets of opposite polarity, the magnets cooperatively dimensioned and positioned to establish a magnetic field orthogonal to the direction of propellant flow through the electrodes and orthogonal to the electrodes.

2. The microgenerator cell of claim 1, wherein the microchamber is disposed on a substantially planar silicon substrate.

3. The microgenerator cell of claim 2, wherein the microchamber is disposed on the substantially planar silicon substrate using deep reactive ion etching.

4. The microgenerator cell of claim 1, wherein the explosive igniter further comprises:
   an explosive material positioned within the first cavity; and
   a resistive heater positioned adjacent to the explosive material, the resistor separated from the explosive material by an insulating layer.

5. The microgenerator cell of claim 4, wherein the explosive material is lead styphnate.

6. The microgenerator cell of claim 4, wherein the resistive heater is a poly-silicon micro-resistor.

7. The microgenerator cell of claim 1, wherein the propellant is a gas having high electrical conductivity.

8. The microgenerator cell of claim 1, wherein the propellant is plasma.

9. The microgenerator cell of claim 1, wherein the propellant is plasma seeded with an alkali metal.

10. The microgenerator cell of claim 1, wherein the electrodes are parallel plate electrodes.

11. The microgenerator cell of claim 1, further comprising a load in circuit communication with the electrodes.

12. The microgenerator cell of claim 1, wherein the magnets are permanent magnets.

13. A microgenerator comprising a plurality of microgenerator cells, wherein each of the microgenerator cells comprise:
   a chamber having a first cavity and a second cavity;
   an explosive igniter at least partially suspended within the first cavity;
   a diaphragm positioned between the first cavity and the second cavity, the diaphragm cooperatively dimensioned with the igniter to rupture upon the explosion of the explosive igniter;
   a plasma disposed in the second cavity, the plasma selected to expand rapidly in response to the igniter exploding through the ruptured diaphragm;
   two parallel plate electrodes positioned at a distal end of the second cavity, the electrodes cooperatively dimensioned with the second cavity such that the plasma flows between the electrodes upon expansion; and
   two magnets of opposite polarity, the magnets cooperatively dimensioned and positioned to establish a magnetic field orthogonal to the direction of plasma flow through the electrodes.

14. The microgenerator cell array of claim 13, wherein the explosive igniters are individually selectable and ignitable.

15. The microgenerator cell of claim 4, wherein the explosive material is selected from the group consisting of a primary single charge explosive and a multicharge explosive material triggered by a primary explosive.

16. The microgenerator cell of claim 15, wherein the explosive material is lead styphnate.

17. The microgenerator cell of claim 4, wherein the resistive heater is microfabricated of integrated at a wafer level.

18. The microgenerator cell of claim 1, wherein the propellant is plasma seeded with an alkali metal to significantly enhance the efficiency of the cell.

19. The microgenerator cell of claim 17, wherein the igniter is constructed from poly-silicon.

20. The microgenerator cell of claim 1, wherein the cell is one of a plurality of microgenerator cells, wherein the explosive igniters of each of the plurality of cells are individually selectable and ignitable.

* * * * *